United States Patent
Takayasu et al.

(10) Patent No.: US 7,242,789 B2
(45) Date of Patent: Jul. 10, 2007

(54) MOVING-BODY DETECTING IMAGE SENSOR

(75) Inventors: Misako Takayasu, Tokyo (JP); Hideki Takayasu, Tokyo (JP); Amane Koizumi, Kanagawa (JP); Junichi Akita, Hokkaido (JP)

(73) Assignee: Sony Corporation (JP)

( * ) Notice: Subject to any disclaimer, the term of this patent is extended or adjusted under 35 U.S.C. 154(b) by 810 days.

(21) Appl. No.: 10/445,654

(22) Filed: May 27, 2003

(65) Prior Publication Data

US 2004/0057058 A1    Mar. 25, 2004

(30) Foreign Application Priority Data

Jun. 17, 2002   (JP)   .............................. P2002-175312

(51) Int. Cl.
  *G06K 9/00*   (2006.01)
(52) U.S. Cl. .................. 382/100; 250/206.1; 356/3.08
(58) Field of Classification Search ................ 382/100, 382/107; 250/206.1, 208.1; 356/3.08, 4.01
See application file for complete search history.

(56) References Cited

U.S. PATENT DOCUMENTS

| | | | | |
|---|---|---|---|---|
| 4,140,060 A | * | 2/1979 | Brenner | 102/214 |
| 4,292,672 A | * | 9/1981 | Southgate | 702/40 |
| 4,480,192 A | * | 10/1984 | Albrecht et al. | 250/550 |
| 4,502,134 A | * | 2/1985 | Kondo et al. | 369/44.32 |
| 7,024,111 B2 | * | 4/2006 | Knox et al. | 398/25 |
| 2003/0147653 A1 | * | 8/2003 | Pescod | 398/161 |

* cited by examiner

*Primary Examiner*—Vikkram Bali
*Assistant Examiner*—Anand Bhatnagar
(74) *Attorney, Agent, or Firm*—Lerner, David, Littenberg, Krumholz & Mentlik, LLP

(57) ABSTRACT

Two photodetectors output electric signals based on the detection of light at light receiving sections mutually spaced apart. The output signal of one of the photodetectors is delayed and a first pulse signal is generated, and second pulse signal having no delay is generated according to based on the detection signal of the other of the two photodetectors. A detection signal is output when the pulse signals overlap. According to whether the detection signal is output, a movement direction and speed of a moving body that moves between the light receiving sections are detected.

7 Claims, 12 Drawing Sheets

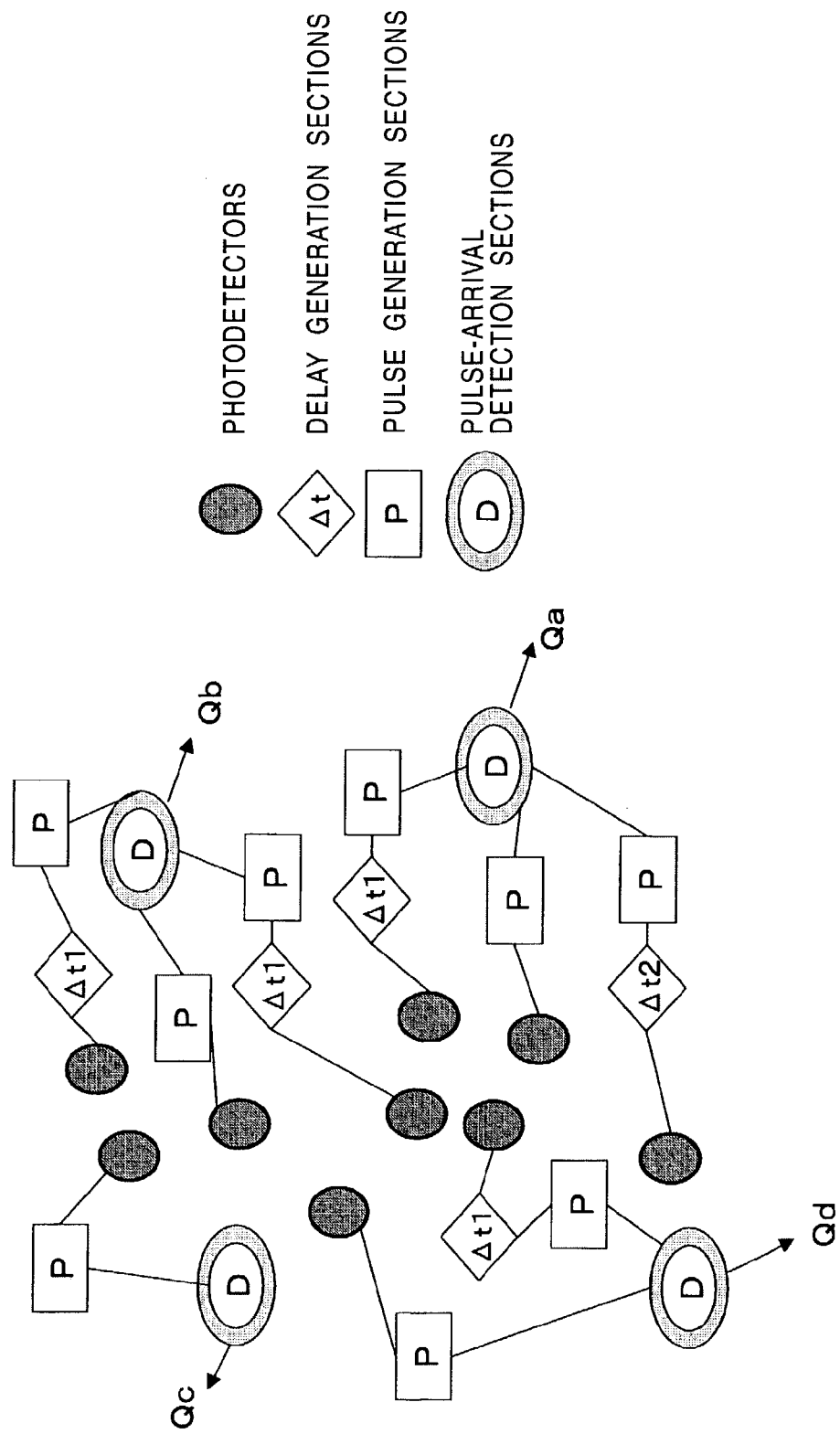

MOVING-BODY DETECTING IMAGE SENSOR

BACKGROUND OF THE INVENTION

1. Field of the Invention

The present invention relates to moving-body detecting image sensors for generating an output based on the movement direction and speed of a moving body, and more particularly, to a moving-body detecting image sensor capable of generating an output based on the movement direction of a moving body, by processing an input signal sent from a plurality of light receiving elements.

2. Description of the Related Art

Charge coupled devices (CCDs) have been well known as elements used for picking up images. In many image processing systems, an image picked up by a video camera having a CCD is input, for example, to a personal computer (PC), and various processes are applied to the image data and the image is reproduced by software and hardware in the PC.

Using software for image processing increases the flexibility of the processing. When there are a large number of pixels, or an advanced process is executed, however, data transfer between the camera and the computer or between a memory and a processor in the computer limits the entire processing speed in many cases. Research has been actively made concerning high-speed algorithm and signal processing with a parallel architecture to eliminate the limitation.

In the research, however, a sequential processing method in which processing is sequentially applied to pixels which form an image is mainly used. Therefore, it is difficult to expect a dramatic higher speed and a dramatic higher function. On the other hand, so-called "vision chips" have been widely researched in which some information processing functions are taken into image sensors by the use of the progress of integrated-circuit technologies. The vision chips are described, for example, in "Modeling Selective Attention Using a Neuromorphic Analog VLSI Device," written by G. Indiveri, Neural Computation, Vol. 12, No. 12, pp. 2857–2880, 2000, or in "High Performance Biomorphic Image Processing Under Tight Space and Power Constraints," written by R. Etienne-Cummings et al., Autonomous Robots, Vol. 11, No. 3, pp. 227–232, 2001.

In the vision-chip research, however, relatively simple processes, such as noise removal and edge detection, have been mainly handled, and outputs are images obtained after the processes, in many cases. In applications to robot vision, for example, the "meaning" of an image is finally required, and software processing by the use of a computer needs to be applied to extract the meaning.

SUMMARY OF THE INVENTION

The present invention has been made in consideration of the above-described conventional technical problems. An object of the present invention is to provide a moving-body detecting image sensor capable of detecting the speed and the direction of a moving body in a picked-up image and of outputting them, as an image sensor capable of outputting one "meaning" of an image picked up by a camera, which image sensor serves as a structure for reducing the degree of dependency on software processing of the image picked up by the camera.

The above object is achieved in one aspect of the present invention through the provision of a moving-body detecting image sensor including two photodetectors connected, respectively, to two light receiving sections disposed apart in space, for outputting electric signals according to the detection of light at the light receiving sections; a delay generation section for receiving the output signal of one of the two photodetectors and for outputting a delayed signal generated by delaying the output signal; a first pulse generation section for receiving the delayed signal from the delay generation section and for generating a first pulse signal according to the delayed signal; a second pulse generation section for receiving the output signal of the other of the two photodetectors and for generating a second pulse signal according to the output signal; and a pulse-arrival detection section for receiving the first pulse signal and the second pulse signal from the first pulse generation section and the second pulse generation section and for outputting a third signal when receiving the first and second pulse signals overlappingly.

The moving-body detecting image sensor may be configured such that the delay generation section includes a capacitor to provide a structure which delays a received signal according to the discharging period of the capacitor, and a transistor to which a bias voltage is applied for allowing a delay period to be adjusted.

The moving-body detecting image sensor may be configured such that each of the first pulse generation section and the second pulse generation section comprises a capacitor to provide a structure which generates a pulse with a pulse width corresponding to the discharging period of the capacitor, and a transistor to which a bias voltage is applied for allowing the pulse width to be adjusted.

The moving-body detecting image sensor may be configured such that the pulse-arrival detection section includes an AND circuit for receiving the first pulse signal and the second pulse signal from the first pulse generation section and the second pulse generation section and for outputting the third signal when receiving the first and second pulse signals overlappingly.

The moving-body detecting image sensor may be configured such that each of the two photodetectors includes a photodiode serving as a photodetection element and a transistor to which a bias voltage is applied to adjust the level of the output signal.

The moving-body detecting image sensor may be configured such that the one of the two photodetectors includes a NOR gate for maintaining the signal output to the delay generation section at a high state.

The moving-body detecting image sensor may be configured such that it further includes a plurality of light receiving sections disposed at random at separate positions, and the photodetectors are provided correspondingly to the plurality of light receiving sections, disposed at random.

According to the present invention, an moving-body detecting image sensor having a structure corresponding to the spatial transfer delay of an excitatory signal generated by a cell in a retina of a living body is implemented, and the movement direction and speed of a moving body can be detected according to processing of signals received at a plurality of light receiving sections.

In addition, according to a moving-body detecting image sensor of the present invention, a delay caused by a delay circuit can be set to a various value, so that the movement of a moving body at a various speed can be detected.

Other objects, features, and advantages of the present invention will be made clear from detailed explanations, described later, based on embodiments of the present invention and the accompanying drawings.

BRIEF DESCRIPTION OF THE DRAWINGS

FIG. 12 is a view showing an example structure in which light receiving sections are disposed at random in a moving-body detecting image sensor according to the present invention.

DESCRIPTION OF THE PREFERRED EMBODIMENTS

Figure 1:
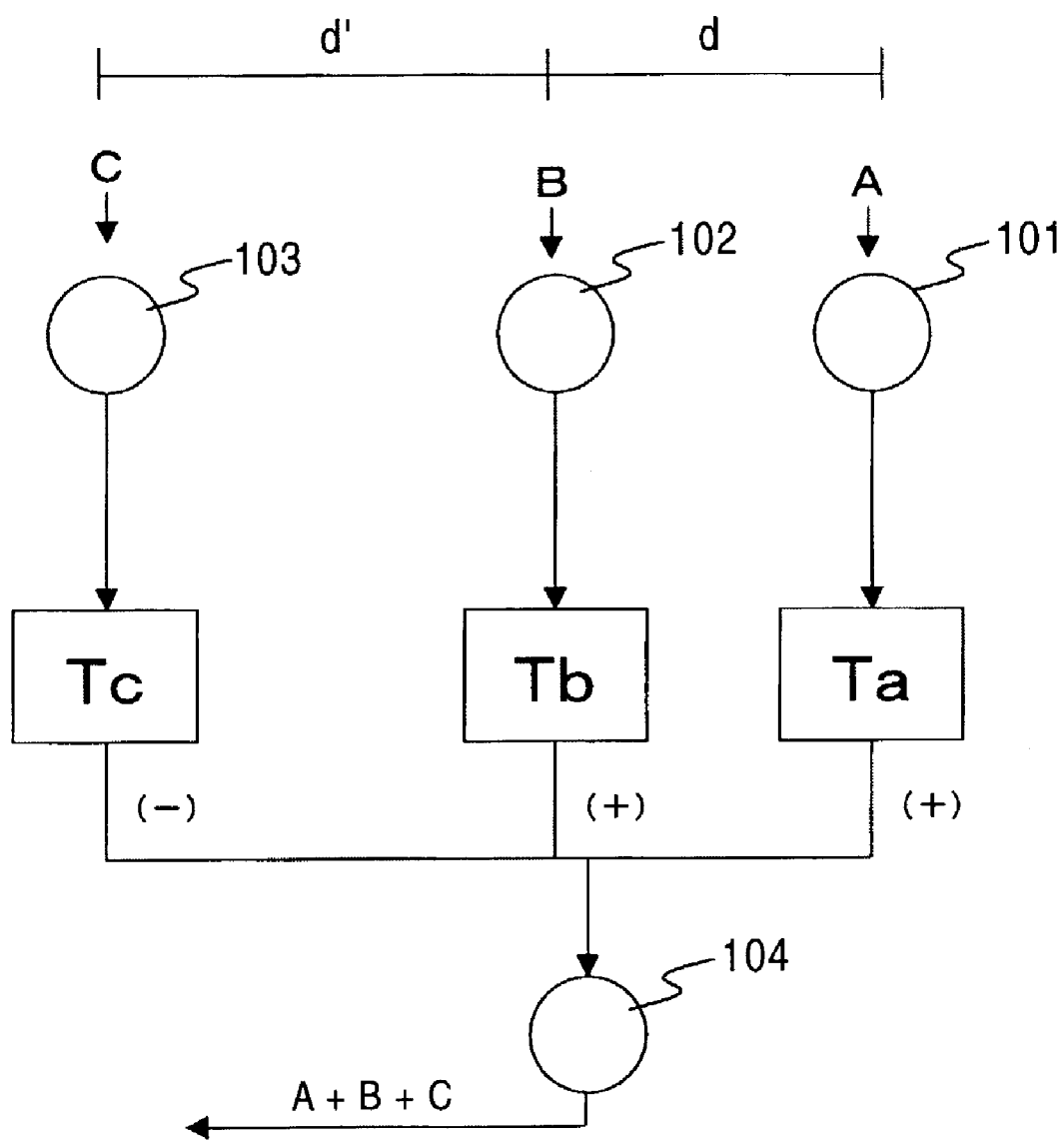
FIG. 1 is a view showing a signal transfer process in a retina of a living body.

A moving-body detecting image sensor according to the present invention will be described below in detail by referring to the drawings.

[1. Moving-Body Detection in Living Body]

The structure of the moving-body detecting image sensor according to the present invention is based on research related to a function in a retina of a living body. It has been known in a retina of a living body that there exist, in addition to light receiving cells, such as cones and rods, serving as light receiving elements, cells such as horizontal cells and ganglion cells, and a network thereof is formed. It is also known that with this network, the retina not only serves as an image pickup device but has a function for executing an initial visual-information process.

One of the information processing functions of the retina is to detect the direction and speed of a luminous point which moves on the retina. The mechanism of this function called direction selectivity has not yet been found. It was conventionally thought that, between an excitatory signal and an inhibitory signal held by nerves, the inhibitory signal played a more important role. Recently, it has been known that, in the retinas of part of animals such as turtles, only excitatory signals are generated and inhibitory signals are not generated.

FIG. 1 is a view showing a function for detecting the direction and speed of the movement of a luminous point which moves on a retina, that is, processing executed on a retina of a living body, which implements direction selectivity.

The retina has a structure in which a great number of cells are disposed, those cells including bipolar cells A 101 and B 102 for outputting a positive pulse signal having a predetermined width (T0) when detecting light; an amacrine cells C 103 for outputting a negative pulse signal having the predetermined width (T0) when detecting light; and a ganglion cell for receiving the signals from the bipolar cells A 101 and B 102 and the amacrine cell C 103 and for outputting a signal to the brain when a signal obtained by adding the signals has a value equal to a predetermined threshold or larger.

Signal delays from the bipolar cells A 101 and B 102 to the ganglion cell 104, and a signal delay from the amacrine cell C 103 to the ganglion cell 104 differ depending on the lengths and structures of their respective signal-transfer lines.

The signal delay from the bipolar cell A 101 to the ganglion cell 104 is called Ta, the signal delay from the bipolar cell B 102 to the ganglion cell 104 is called Tb, and the signal delay from the amacrine cell C 103 to the ganglion cell 104 is called Tc. The distance from the bipolar cell A 101 to the bipolar cell B 102 is called "d" and the distance from the amacrine cell C 103 to the bipolar cell B 102 is called "d'".

Processing for detecting the movement direction of a moving body by using only the bipolar cells A 101 and B 102 and not using the amacrine cell, which outputs a negative signal, will be described first by referring to FIG. 2A and FIG. 2B.

Figure 2A:
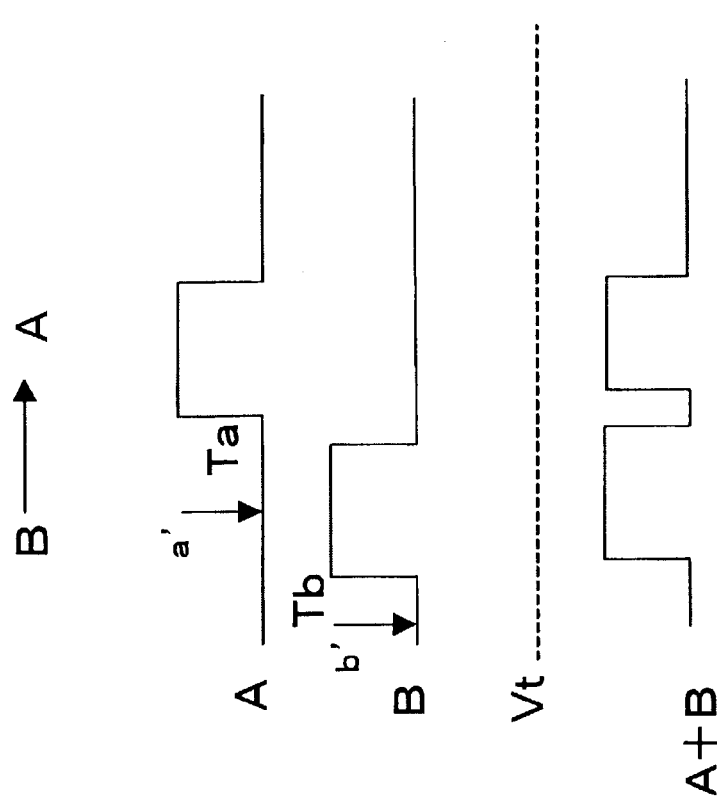
FIG. 2A and FIG. 2B are views showing a moving-body detecting process which uses signal transfer in the retina of the living body.

FIG. 2A shows the output of the bipolar cell A 101, the output of the bipolar cell B 102, and a signal obtained by adding the two outputs, in that order from the top in a case in which a moving body moves from the bipolar cell A to the bipolar cell B. The ganglion cell 104 outputs a signal to the brain when the signal obtained by adding the two outputs reaches a threshold.

When the moving body moves from the bipolar cell A to the bipolar cell B, the bipolar cell A 101 detects light emitted from the moving body, at a point indicated by an arrow "a", and after the delay period Ta, outputs a pulse signal having the pulse width T0 to the ganglion cell 104. The bipolar cell B 102 detects light emitted from the moving body, at a point indicated by an arrow "b", and after the delay period Tb, outputs a pulse signal having the pulse width T0 to the ganglion cell 104. It is assumed that Ta>Tb.

The signal obtained by adding the two outputs is shown at the bottom of FIG. 2A. The ganglion cell 104 outputs a signal to the brain when the signal obtained by adding the two outputs is equal to or larger than the threshold Vt. As is clear from the figure, since the signal obtained by adding the two outputs has a portion 201 which is above the threshold Vt, the ganglion cell 104 outputs a signal to the brain.

Figure 2B:
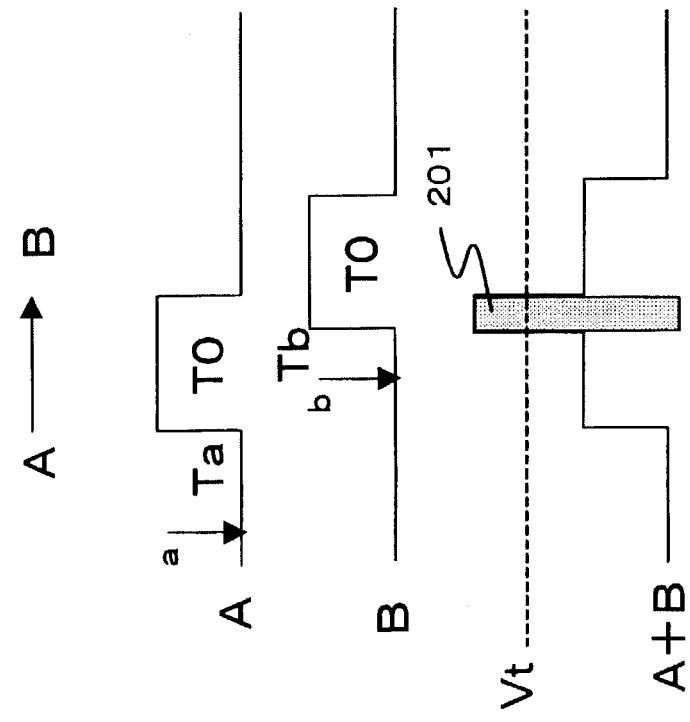

FIG. 2B shows signal transition in a case when the moving body moves from the bipolar cell B to the bipolar cell A. The bipolar cell B 102 detects light emitted from the moving body, at a point indicated by an arrow "b'", and after the delay period Tb, outputs a pulse signal having the pulse width T0 to the ganglion cell 104. The bipolar cell A 101 detects light emitted from the moving body, at a point indicated by an arrow "a'", and after the delay period Ta, outputs a pulse signal having the pulse width T0 to the ganglion cell 104. In the same way as shown in FIG. 2A, it is assumed that Ta>Tb.

The signal obtained by adding the two outputs is shown at the bottom of FIG. 2B. The ganglion cell 104 outputs a signal to the brain when the signal obtained by adding the two outputs is equal to or larger than the threshold Vt. As is clear from the figure, since the signal obtained by adding the two outputs has no portion which is above the threshold Vt, the ganglion cell 104 does not transfer a signal to the brain.

As described above, since the ganglion cell 104 outputs a signal only when the moving body moves in a fixed direction, cells in a retina of a living body function as a direction detecting sensor.

The operation of the amacrine cell C 103, which outputs a negative signal to the ganglion cell 104, will be described next by referring to FIG. 3A to FIG. 3D.

Figure 3A:
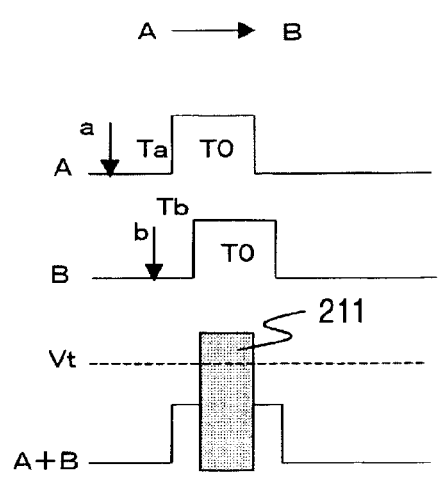
FIG. 3A, FIG. 3B, FIG. 3C, and FIG. 3D are views showing a moving-body detecting process which uses signal transfer in the retina of the living body.
Figure 3B:
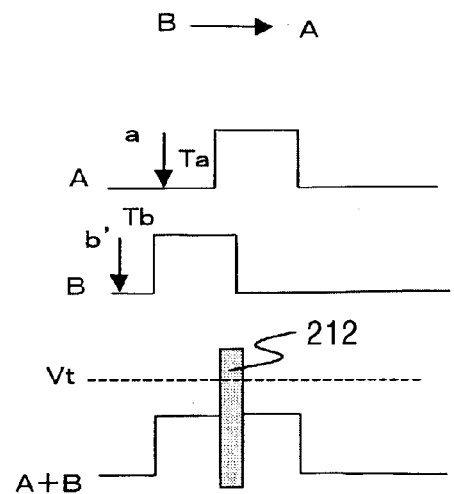

FIG. 3A and FIG. 3B show the outputs of the cells and the signal obtained by adding the outputs in cases in which the moving body moves from the bipolar cell A to the bipolar cell B and from the bipolar cell B to the bipolar cell A, in the same way as FIG. 2A and FIG. 2B. The movement speed of the moving body is faster in FIG. 3A and FIG. 3B than in FIG. 2A and FIG. 2B.

When the moving body moves at a high speed from the bipolar cell A to the bipolar cell B, the time distance between the arrows "a" and "b" becomes shorter than in FIG. 2A, and as a result, the overlapping period of the pulse signals output from the bipolar cells A and B is extended, and a portion 211 where the signal obtained by adding the outputs exceeds the threshold Vt also becomes long. The ganglion cell 104 sends a signal to the brain, as shown in FIG. 3A.

When the moving body moves at a high speed from the bipolar cell B to the bipolar cell A, the pulse signals output from the bipolar cells A and B overlap as shown in FIG. 3B, unlike the case shown in FIG. 2B. As a result, a portion 212 where the signal obtained by adding the outputs exceeds the threshold Vt is generated, and the ganglion cell 104 sends a signal to the brain.

As described above, when the moving body moves at a high speed, a portion where the signal obtained by adding the outputs exceeds the threshold Vt is generated either in a case in which the moving body moves from the bipolar cell A to the bipolar cell B, or a case in which the moving body moves from the bipolar cell B to the bipolar cell A. The ganglion cell 104 sends a signal to the brain in either case, and therefore, the movement direction of the moving body cannot be detected.

Figure 3C:
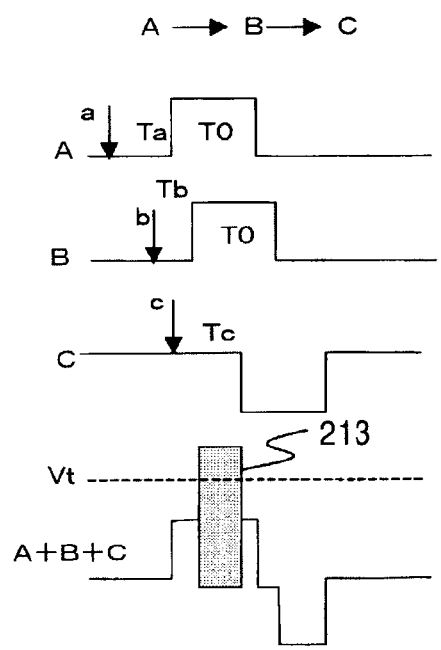
Figure 3D:
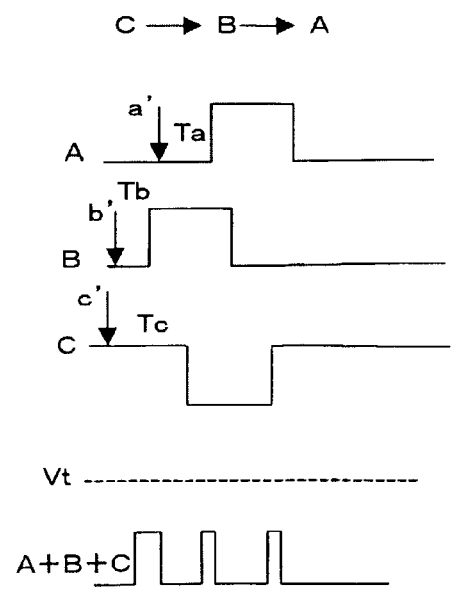

To solve this inconvenience, the amacrine cell C 103, which sends a negative signal to the ganglion cell 104, is used. FIG. 3C and FIG. 3D show signal transition in which the signal output from the amacrine cell C 103 is taken into consideration.

FIG. 3C and FIG. 3D show the outputs of the bipolar cells and the amacrine cell and a signal obtained by adding the outputs in cases in which the moving body moves from the bipolar cell A through the bipolar cell B to the amacrine cell C and in which the moving body moves from the amacrine cell C through the bipolar cell B to the bipolar cell A, which correspond to the movements of the moving body in the same directions as those shown in FIG. 3A and FIG. 3B. The movement speed of the moving body is high, as in FIG. 3A and FIG. 3B.

When the moving body moves from the bipolar cell A through the bipolar cell B to the amacrine cell C, the signal obtained by adding the three outputs is suppressed to some extent by the addition of the negative signal of the amacrine cell C, but a portion 213 where the signal obtained by adding the three outputs exceeds the threshold Vt is generated, as shown in FIG. 3C. The ganglion cell 104 sends a signal to the brain.

When the moving body moves from the amacrine cell C through the bipolar cell B to the bipolar cell A, the signal obtained by adding the three outputs is suppressed to the threshold Vt or smaller by the addition of the negative signal, and a portion where the signal obtained by adding the three outputs exceeds the threshold Vt is not generated, as shown in FIG. 3D. Therefore, the ganglion cell 104 does not send a signal to the brain.

As described above, even when the moving body moves in a fixed direction at a high speed, the movement direction of the moving body is allowed by the operation of the amacrine cell C 103, which sends a negative output serving as a suppression signal to the ganglion cell 104.

Direction selectivity can be implemented only with the above-described positive signals (excitatory signals) output from the bipolar cells to the ganglion cell. This can be made clear by using the following simplified electric circuit model.

Figure 4A:
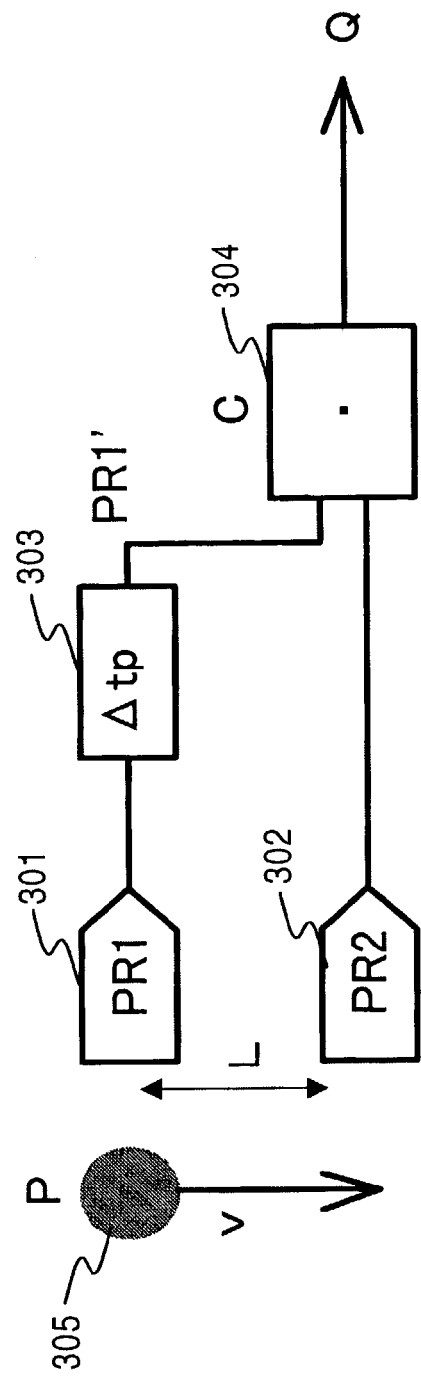
FIG. 4A and FIG. 4B are views showing an outlined structure of and signals used in a sensor which achieves the moving-body detecting process that uses signal transfer in the retina of the living body.
Figure 4B:
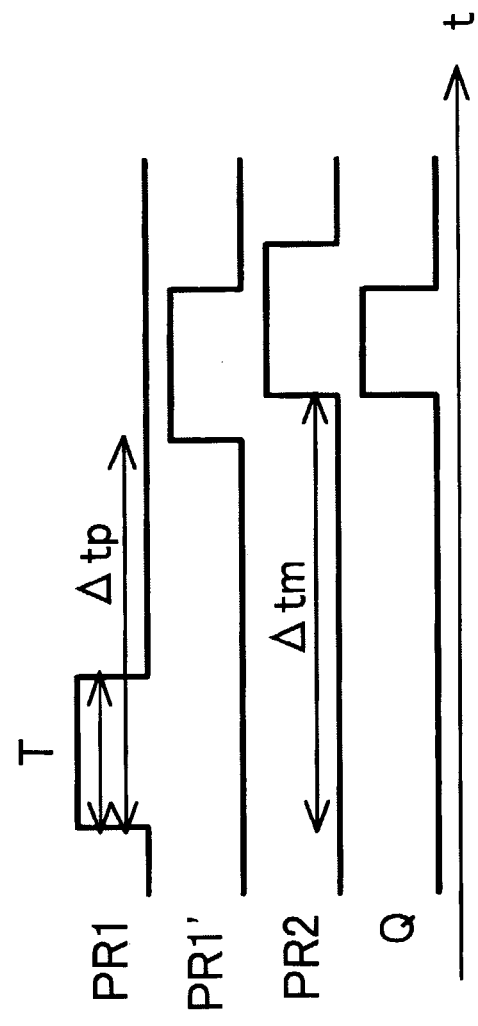

As shown in FIG. 4, it is assumed that there are disposed two light receiving elements PR1 301 and PR2 302 for emitting excitatory signals having a width T when receiving light, which correspond to the bipolar cells, and the time difference between the times when the light-receiving elements PR1 301 and PR2 302 detect sequentially a moving luminous point P305 is $\Delta tm$.

In other words, $\Delta tm = L/v$, where "L2 indicates the spatial distance between the two light receiving elements PR1 301 and PR2 302, and "v" indicates the speed of the moving luminous point P. The excitatory signal emitted by the light receiving element PR1 301 is sent to a detection element C 304 corresponding to the ganglion cell, through a delay element 303 which cause a delay $\Delta tp$. In other words, the output signal of the light receiving element PR1 301 reaches the detection element C 304 by a time difference of $\Delta tp$.

The detection element C 304, which connects to the two light receiving elements PR1 301 and PR2 303 and corresponds to the ganglion cell, outputs a signal Q only when the excitatory signals sent from the two light receiving elements PR1 301 and PR2 302 overlappingly reach the detection element C 304. The signal Q is output when the following condition is satisfied.

$$|\Delta tm - \Delta tp| < T \qquad (1)$$

This signal Q corresponds to a signal sent from the ganglion cell to the brain. When the signal Q is generated, it is determined that the above condition (1) is satisfied. This means that, it is also determined that the luminous point 305 moved in the direction from the light receiving element PR1 301 to the light receiving element PR2 302, and that the speed "v" of the luminous point is about $L/\Delta tp$.

Since the distance L between the light receiving element PR1 301 and the light receiving element PR2 302, and the signal delay time $\Delta tp$ from the light-receiving element PR1 301 to the detection element C 304, which corresponds to the ganglion cell, are determined only by the spatial arrangement of the two light-receiving elements PR1 301 and PR2 302, and the delay element, the movement direction and speed of the luminous point P 305 can be determined only by the output Q of the detection element C 304, which correspond to the ganglion cell.

[2. Moving-Body Detecting Image Sensor Which Uses the Spatial Transfer Delay of an Excitatory Signal]

As is clear from the above description, movement can be detected only by the positive signal (excitatory signal) output from a bipolar cell in a living body.

The structure of an image sensor according to the present invention, which has a moving-body detecting function to which algorithm for executing the output of a signal corresponding to the excitatory signal output from a bipolar cell in a living body and executing signal processing is applied, will be described below.

Figure 5:
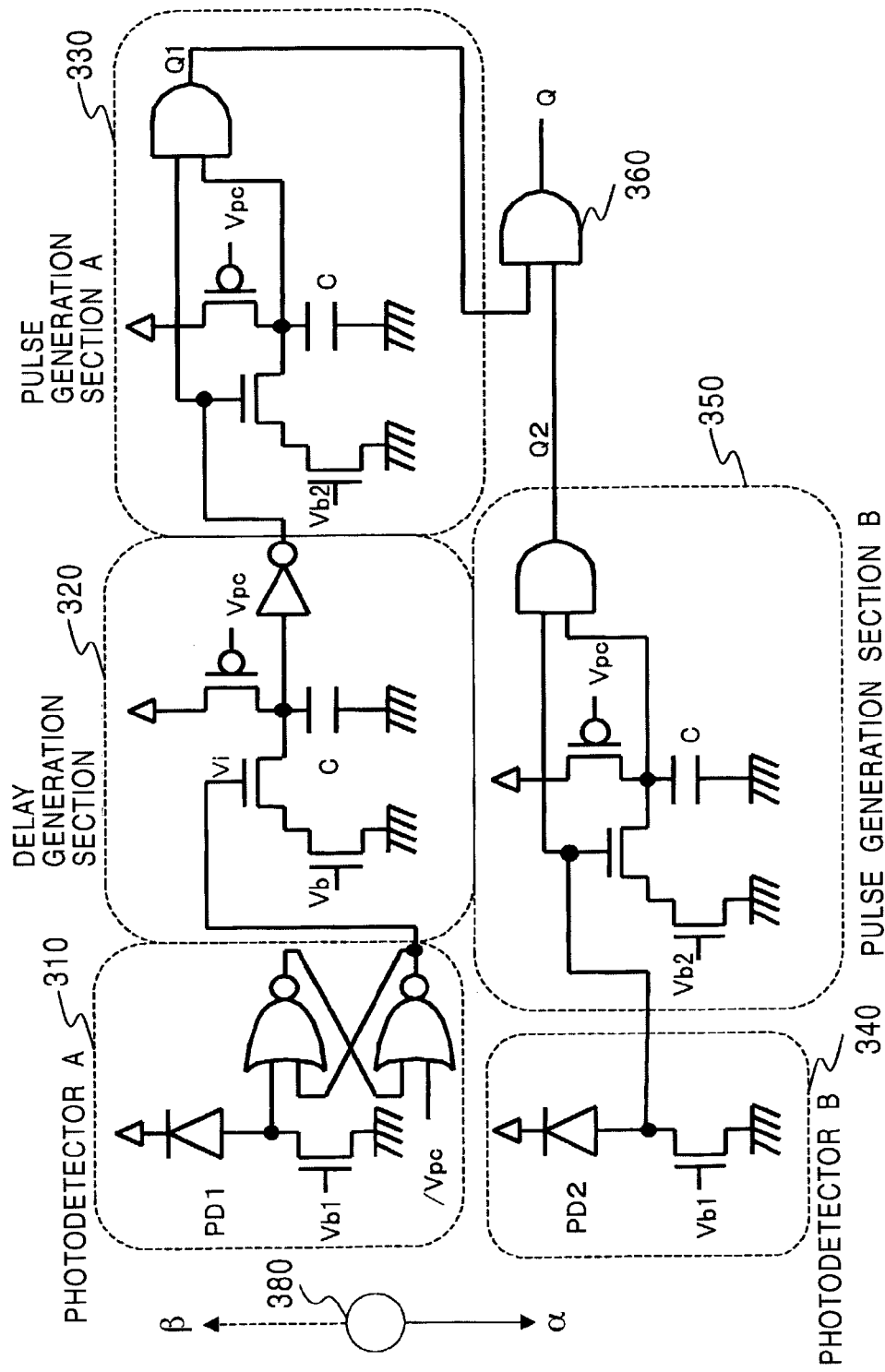
FIG. 5 is a circuit diagram showing the entire structure of a moving-body detecting image sensor according to the present invention.

FIG. 5 shows the entire structure of the image sensor according to the present invention. The image sensor according to the present invention has a structure corresponding to two bipolar cells and one ganglion cell in a retina of a living body, described above.

A photodetector A 310 and a photodetector B 340 have photodiodes PD1 and PD2 for receiving light of a moving body 380 to generate current, respectively. The moving body 280 moves in an arrow direction α or in an arrow direction β. Therefore, according to the direction in which the moving body 380 moves, one of the photodetector A 310 and the photodetector B 340 receives light first, and then, the other receives light with a delay.

An electric signal generated by the light detected by the photodetector A 310 is delayed for a predetermined period through a delay generation section 320; is input to a pulse generation section A 330; and is then delayed for a predetermined period (for example, Ta); a pulse Q1 having a predetermined width (T) is generated; and is output to an AND circuit 360.

An electric signal generated by the light detected by the photodetector B 340 is input to a pulse generation section 350 without being sent through a delay generation section; a pulse Q2 having the predetermined width (T) is generated; and is output to the AND circuit 360.

The AND circuit 360 executes a process corresponding to that of a ganglion cell in a retina of a living body, described above. Only when the pulse Q1 and the pulse Q2 are input overlappingly, the AND circuit produces an output Q.

Each of the plurality of circuit sections constituting the image sensor according to the present invention, shown in FIG. 5, will be described in detail.

A. Photodetectors and Pulse Generation Sections

Figure 6:
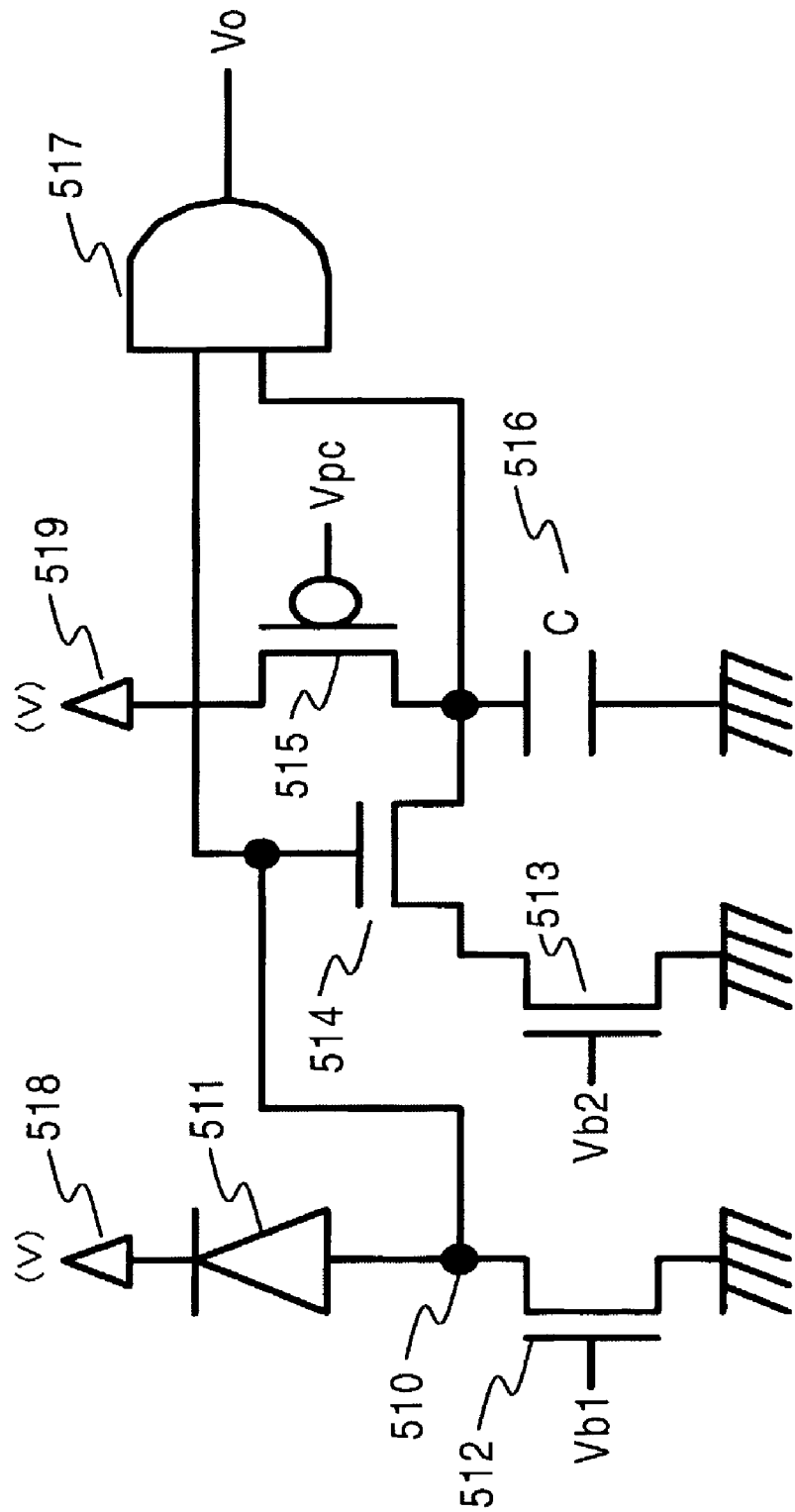
FIG. 6 is a circuit diagram showing the structure of a photodetector and a pulse generation section constituting the moving-body detecting image sensor according to the present invention.

FIG. 6 shows a basic circuit structure of the photodetectors and the pulse generation sections constituting the image sensor according to the present invention. The circuit structure shown in FIG. 6 corresponds to the combined structure the photodetector B and the pulse generation section B in the entire structural view of FIG. 5. The photodetector A in the entire structural view of FIG. 5 further has a NOR gate. The structure of the photodetector having the NOR gate will be described later by referring to FIG. 7.

Details of the circuit will be described by referring to FIG. 6. The photodetector and the pulse generation section are formed of a photodiode 511 for generating current according to detected light, a plurality of transistors 512, 513, 514, and 515 for discharging a capacitor 516 having a capacitance C by the voltage generated by the photocurrent, and an AND circuit 517.

In the circuit structure shown in FIG. 6, circuit sections 518 and 519 are connected to a power supply (for example, 5 V), a bias voltage of Vb1 is applied to the gate of the MOS transistor 512, and a bias voltage of Vb2 is applied to the gate of the MOS transistor 513. A pre-charging voltage of Vpc is applied to the gate of the MOS transistor 515 to pre-charge the capacitor 516.

Before the operation of the circuit, the capacitor 516 is precharged because a pre-charging voltage of Vpc is applied to the gate of the MOS transistor 515.

When the photodiode 511 detects light sent from a moving body, current flows through the photodiode 511 to generate a voltage at a point 510. The voltage at the point 510 makes current flow through the MOS transistor 514 to discharge the electric charges of the pre-charged capacitor 516 through the transistor 513.

Since the AND circuit 517 receives two "1" (high-level) inputs through its two input lines during a period when the capacitor 516 is discharged, the AND circuit 517 outputs a pulse signal having the time width equal to the period when the capacitor 516 is discharged.

To adjust the pulse width, it is necessary to adjust the time width of the period when the capacitor 516 is discharged. To do this, a bias voltage of Vb2 applied to the gate of the transistor Vb2 needs to be adjusted. The voltage generated at the point 510 can be adjusted by adjusting a bias voltage of Vb1 applied to the gate of the transistor 512.

With this circuit, when the photodiode 511 receives light emitted by the moving body, the AND circuit 517 outputs a pulse having a predetermined time width.

A NOR gate structure is further added to the photodetector A 310 shown in the entire structural view of FIG. 5. The structure of the photodetector, which has the NOR gate, will be described by referring to FIG. 7.

Figure 7:
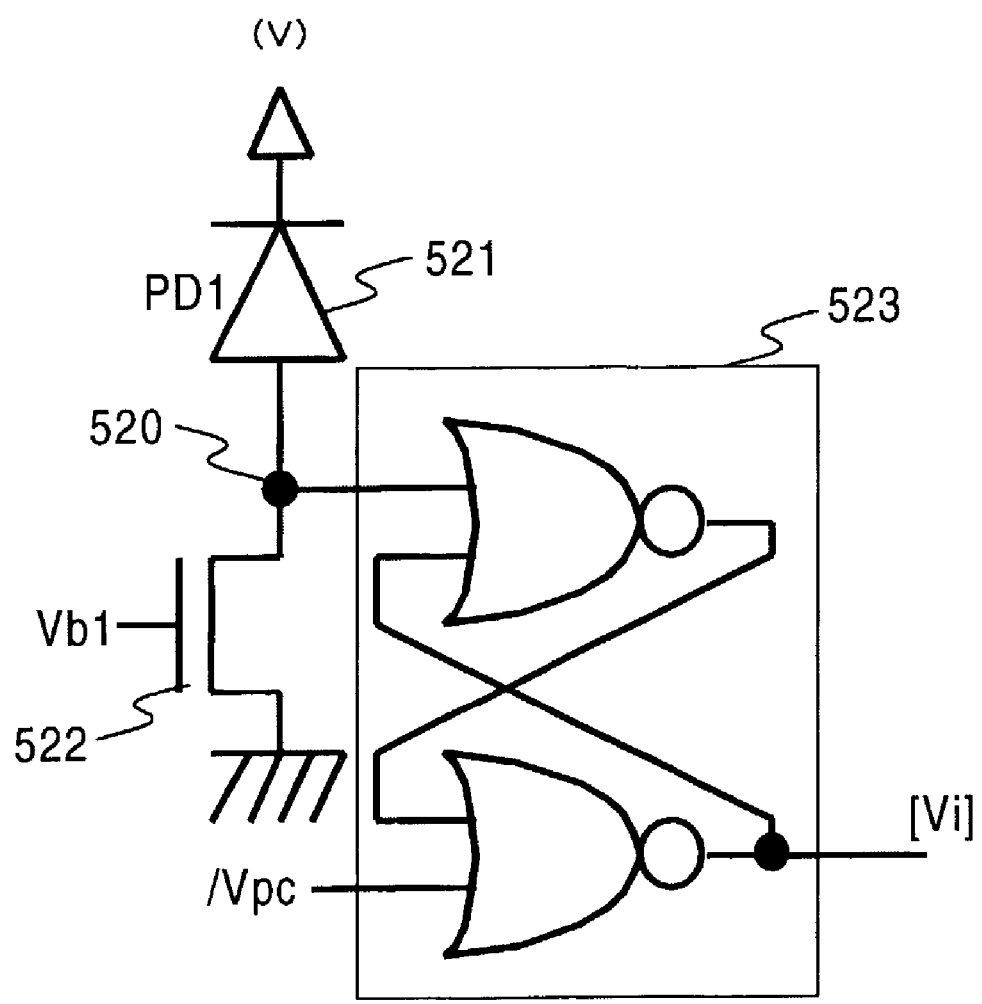
FIG. 7 is a circuit diagram showing the structure of a photodetector to which a NOR gate is added, constituting the moving-body detecting image sensor according to the present invention.

The photodetector A 310, shown in FIG. 5, outputs a signal to the delay generation section 320. This signal needs to be maintained at "1" from the time when the photodiode PD1 521 receives light. To maintain the signal, a NOR gate 523 shown in FIG. 7 is added.

The NOR gate 523 is formed of four MOS transistors, and outputs "the negation of the logical OR" of two inputs. One input of the NOR gate 523 is connected to a point A where a voltage is generated when light is incident on the photodiode PD1 521, and the other input is connected to /Vpc, which is the negation of the logical value of the pre-charging voltage Vpc. This structure of the NOR gate 523 forms an RS flip flop. When reset, namely, Vpc=0 and /Vpc=1, the photodetector A 310 outputs Vi=0 to the delay generation section 320. When the PD1 is exposed to light and a voltage is generated at a point 520, an input to the NOR gate 523 is changed, and thereafter, the photodetector maintains its output Vi at "1", which is sent to the delay generation section.

B. Delay Generation Section

The structure of the delay generation section, which produces a delay time between when the photodetector A receives light and when a pulse is generated, will be described next. This section is a circuit for producing a delay corresponding to the delay of signal transmission from a bipolar cell to a ganglion cell in a retina of a living body, described before.

The delay generation section delays the electric signal generated by light detected by the photodetector A 310, shown in FIG. 5, for a predetermined delay period (for example, Ta) and inputs it into the pulse generation section A 330.

Figure 8:
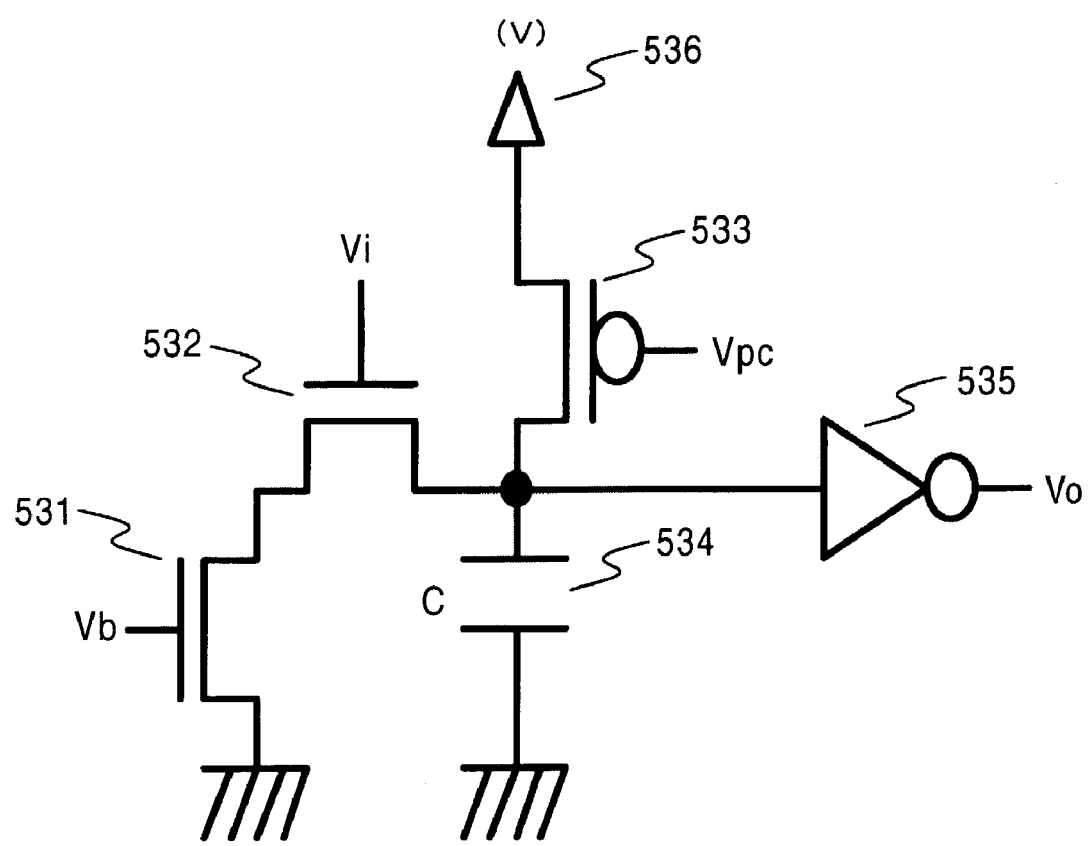
FIG. 8 is a circuit diagram showing the structure of a delay generation section constituting the moving-body detecting image sensor according to the present invention.

A delay generation circuit for generating a delay period having a length nearly equal to that of the period for which a moving object passes between two light receiving sections apart in space will be described by referring to FIG. 8. The delay circuit shown in FIG. 8 is formed of transistors 531, 532, and 533, a capacitor 534, and an inverter 535. A circuit section 536 is connected to a power supply (for example, 5 V), and a bias voltage of Vb is applied to the gate of the MOS transistor 531. A pre-charging voltage Vpc for pre-charging a capacitor 534 is applied to the gate of the MOS transistor 533.

The voltage Vi, which is applied when the photodiode of the photodetector receives light, is input (see FIG. 5) to the gate of the MOS transistor 532. The voltage Vi is a predetermined value output through the NOR gate, and is sent to the gate of the MOS transistor 532 continuously for a determined period.

When it is assumed that the time required for the moving body to pass between the two light receiving sections (PD1 and PD2) apart in space, shown in FIG. 5, is 1 ms, the delay circuit shown in FIG. 8 needs to generate a delay period of about 1 ms. When it is assumed that the capacitance C of the capacitor 524 is about 1 pF, and the delay period is generated by the time required for discharging the capacitor 534, it is necessary to have a resistor having a resistance of about $10^9$ Ω.

To this end, the sub-threshold region of an MOS transistor is used. The sub-threshold region refers to a region where a voltage (Vb) applied to the gate of an MOS transistor is equal to or lower than a threshold, that is, where the resistance is large. Adjusting Vb adjusts the resistance of the MOS transistor 531, which adjusts the discharging time of the capacitor 534.

The operation of the delay circuit shown in FIG. 8 will be described. The capacitor 534 is pre-charged when Vpc is applied through the MOS transistor 533. Then, when the voltage Vi generated by light received by the photodetector is input to the gate of the MOS transistor 532, discharging of the capacitor 534 starts. The discharging period is adjusted by the voltage Vb applied to the gate of the MOS transistor 531.

When discharging of the capacitor 534 starts, the input to the inverter 535 is high, and its output is low. When the capacitor 534 has been discharged, the input of the inverter 535 is changed to low, and its output becomes high. By setting the discharging period to about 1 ms, a high-level signal is output from the delay generation section 320 to the pulse generation section a delay period Δtp of 1 ms after when light is detected by the photodetector A 310, shown in FIG. 5.

C. Pulse-Arrival Detection Section

Figure 9:
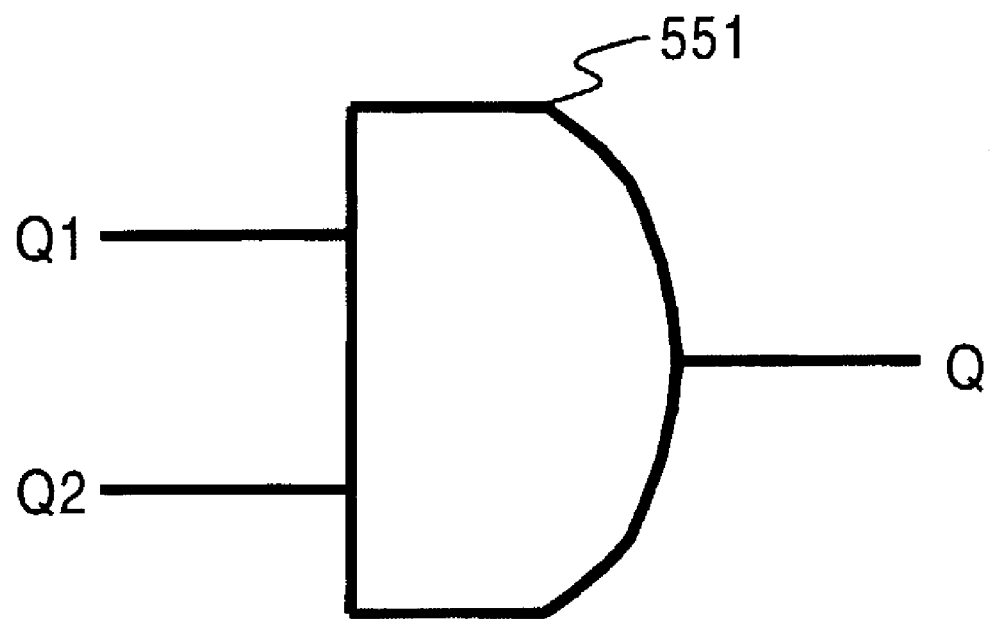
FIG. 9 is a circuit diagram showing the structure of a pulse-arrival detection section constituting the moving-body detecting image sensor according to the present invention.

In the present image sensor, the light receiving sections PD1 and PD2 disposed apart in space, shown in FIG. 5, receive light emitted from the moving body 380 with a time difference; an electric signal based on the light received by the light receiving section PD1 is delayed for Ta; the pulse generation sections A 330 and the pulse generation section B 350 generates pulse signals Q1 and Q2, respectively; and, when the two pulse signals reach at the same time, a signal is output and the moving direction and speed of the moving body 380 are obtained by whether the signal is output or not. FIG. 9 shows a circuit for detecting the simultaneous arrival of the pulses.

A circuit 551 shown in FIG. 9 is the AND circuit 360 shown in FIG. 5. This circuit performs a process corresponding to that executed by a ganglion cell in a retina of a living body. The circuit receives the pulse signals Q1 and Q2 sent from the pulse generation section A 330 and the pulse generation section B 350, and outputs a signal Q when the pulse signals Q1 and Q2 are both high.

The output of the signal Q indicates that the pulse generation section A 330 and the pulse generation section B 350 output the pulse signals Q1 and Q2 overlappingly.

[3. Detection of Moving Body by Image Sensor]

Processing for detecting a moving body by using the image sensor described in the above items, according to the present invention will be described next.

The image sensor according to the present invention has a structure, as shown in FIG. 5, such that the light receiving elements PD1 and PD2 disposed apart in space receive light emitted from the moving body 380 with a time difference; an electric signal of the photodetector A 310 is delayed; and overlapping of the pulses Q1 and Q2 output from the pulse generation sections A and B is detected to output the signal Q.

Results of circuit simulation performed by the use of a circuit simulator HSpiece on the condition that the bias voltages Vb and Vb2 are set to 0.53 V and 0.8 V, respectively, will be described by referring to FIG. 10 and FIG. 11. A VDEC CMOS 0.6-μm process model is used for transistors. Under the above-described bias-voltage condition, the light receiving sections emit pulses having a width T of about 1 μs, and the delay Δtp of the delay generation section is about 250 μs.

The output of the circuit is digital, and a high voltage (+5 V) is set to a logical value "1" and a low voltage (0 V) is set to a logical value "0". At time t=0, light emitted from a luminous point reaches the light receiving section PD1, and an output of "1" is generated. The output is sent to the delay generation circuit disposed immediately thereafter. Since the delay generated by the delay generation circuit is 250 μs, the logical value "1" is sent to the pulse generation circuit 250 μs after the light emitted from the luminous point reaches PD1, and a pulse Q1 having a width of 1 μs is generated.

Figure 10A:
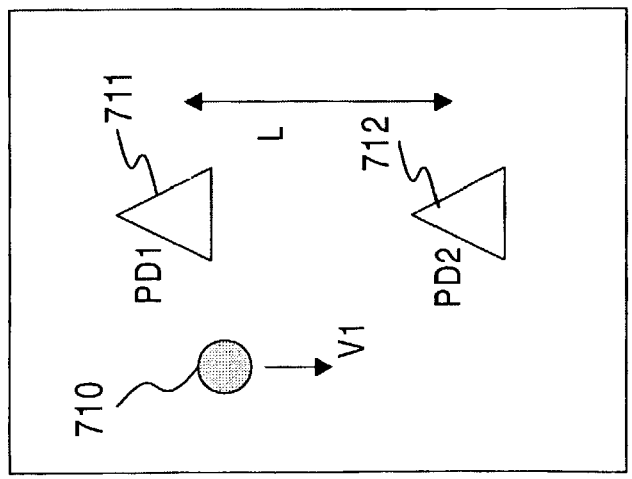
FIG. 10A and FIG. 10B are views showing an example moving-body detecting process performed by the moving-body detecting image sensor according to the present invention.
Figure 10B:
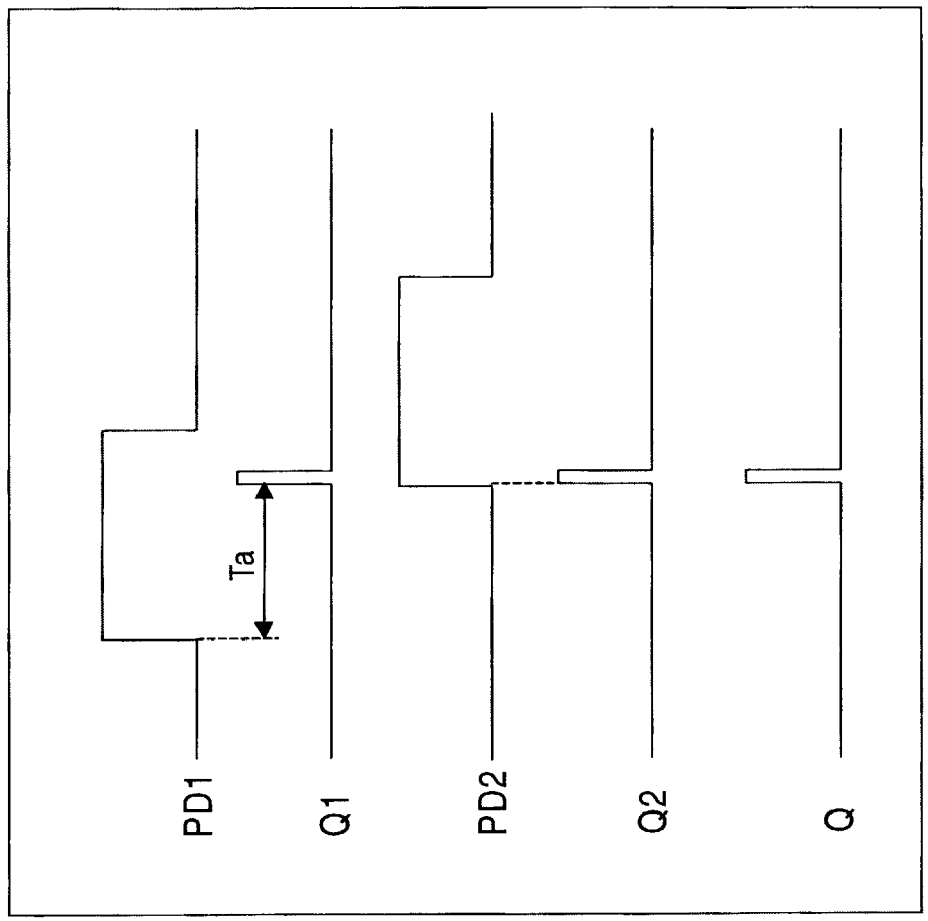

FIG. 10(A) shows a case in which a moving body 710 moves at a relatively low speed (V1) in a direction from a light receiving section PD1 711 to a light receiving section PD2 712 which are disposed apart by a predetermined distance (L). FIG. 10(B) shows the signal transition of a detection signal PD1 generated when the light receiving section PD1 711 detects the movement of the moving body, a pulse Q1 generated based on the detection signal PD1, a detection signal PD2, a pulse Q2 generated based on the detection signal PD2, and a signal Q output from the pulse-arrival detection section with the inputs of the pulses Q1 and Q2.

Light emitted from the moving body 710 is detected by the light receiving section PD1 711, the detection signal is delayed by the delay circuit for the delay period (Ta=250 μs), and then, the pulse Q1 having a width of 1 μs is generated. At a time almost the same as the time when the pulse Q1 is generated, light emitted from the moving body 710 is detected by the light receiving section PD2 712, and the pulse Q2 is generated. In this case, there is a overlap between the pulse Q1 and the pulse Q2, and the pulse signal Q having a width of 1 μs is output from the pulse-arrival detection section formed of an AND circuit.

It can be determined from the output of the pulse signal Q that the luminous point moved in the direction from PD1 to PD2 at the speed corresponding to the distance between PD1 and PD2 and a time period of 250±1 μs.

Figure 11B:
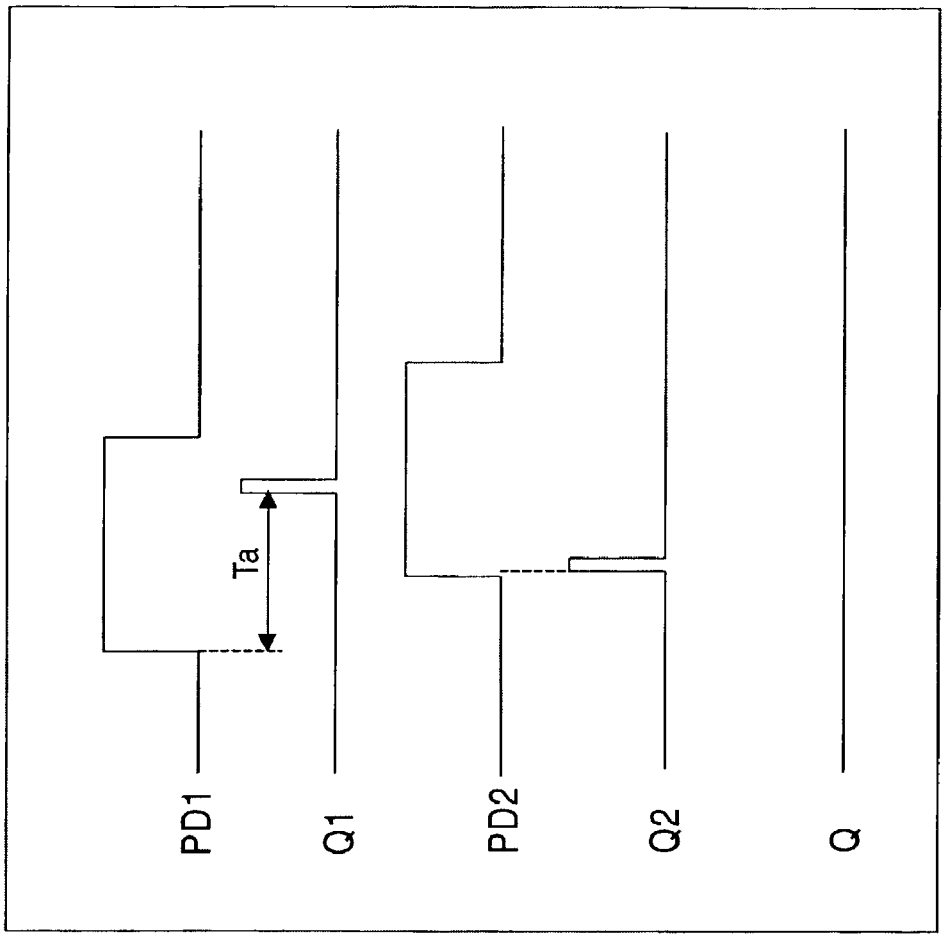
FIG. 11A and FIG. 11B are views showing another example moving-body detecting process performed by the moving-body detecting image sensor according to the present invention.
Figure 11A:
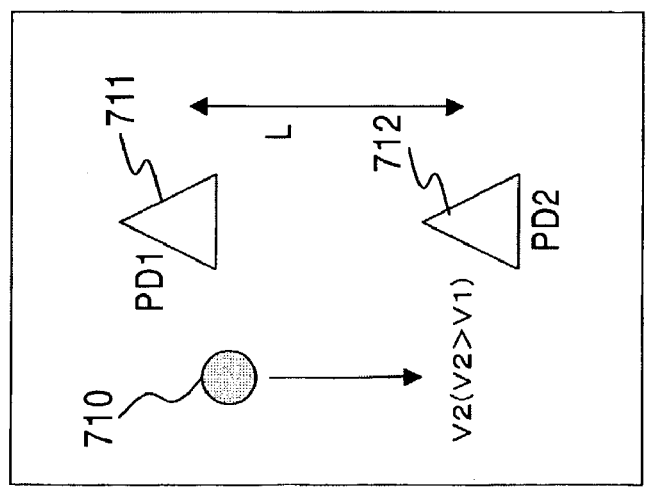

Unlike FIG. 10(A), FIG. 11A shows a case in which the moving body 710 moves at a relatively high speed (V2 where V2>V1) in a direction from the light receiving section PD1 711 to the light receiving section PD2 712 which are disposed apart by the predetermined distance (L). FIG. 11(B) shows a detection signal PD1 generated when the light receiving section PD1 711 detects the movement of the moving body, a pulse Q1 generated based on the detection signal PD1, a detection signal PD2, a pulse Q2 generated based on the detection signal PD2, and a signal Q output from the pulse-arrival detection section with the inputs of the pulses Q1 and Q2.

Light emitted from the moving body 710 is detected by the light receiving section PD1 711, the detection signal is delayed by the delay circuit for the delay period (Ta=250 μs), and then, the pulse Q1 is generated. Before the pulse Q1 is generated, light emitted from the moving body 710 is detected by the light receiving section PD2 712, and the pulse Q2 is generated. The moving body 710 is detected by the light receiving section PD2 712 100 μs after it was detected by the light receiving section PD1 711.

In this case, there is no overlap between the pulse Q1 and the pulse Q2, and as a result, the pulse signal Q is not output from the pulse-arrival detection section formed of the AND circuit.

Therefore, it is determined that the moving body which moved from the light receiving section PD1 711 to the light receiving section PD2 712 for 250 μs was not detected.

In the above-described image sensor, it can be determined when the pulse Q has a logical value of "1" that a luminous point moved from the light receiving section PD1 to the light receiving section PD2 at the speed corresponding to the distance between the light receiving sections and a time period of 250 μs. In this way, the movement of a luminous point which can be detected by the circuit can be determined by the spatial arrangement, the direction and the distance, of the two light receiving sections, and the delay time generated by the delay generation circuit.

[4. Architecture for Detecting a Movement in Any Direction]

In usual image sensors, light receiving sections are disposed in a checker manner to fill up a square plane or a hexagonal plane. This arrangement is effective in terms of simplicity of reading signals from the light receiving sections or simplified design of the image sensors. It is especially effective for those used in video cameras where images are generated by scanning lines. This checker-manner arrangement of the light receiving sections, however, produces a peculiarity in the direction of a luminous point or a luminous line on a plane.

To eliminate this peculiarity, it is preferred that light receiving sections be disposed at random in space. This random arrangement of light receiving sections in space corresponds to no peculiarity in terms of directions. In other words, it can be considered that an image sensor formed of light receiving sections disposed ideally at random in space does not have any direction peculiarity for an image concerned.

Therefore, as shown in FIG. 12, photodetectors are disposed at random, each of them is connected directly to a pulse generation section or to a pulse generation section through a delay generation section which produces a predetermined delay period Δtx, and the outputs of a plurality of pulse generation sections are input to a pulse-arrival detection section. With this structure, an image sensor capable of detecting the movement of a moving body in various directions according to whether each pulse-arrival detection section outputs a signal is made. When the delay periods produced by the delay generation sections are set to various values, various movement speeds can be detected.

The detection of a movement of a moving body is determined only by a combination of a light receiving section disposed at the start point and a light receiving section disposed at the end point. From these features, even when the light receiving sections are disposed as shown in FIG. 12 in space, the outputs thereof can be analyzed according to their positions to detect various movements of the moving body. If it is possible that delay circuits with various delay periods are disposed uniformly in space and the connections thereof to light receiving sections are also made uniform in space, the movements of a luminous point at various speeds can be ideally detected in any spatial directions.

As described above, in a moving-body detecting image sensor according to the present invention, a signal corresponding to an excitatory signal emitted by a bipolar cell in a signal processing system in a retina of a living body is generated, and the spatial propagation delay of the signal is used to allow the movement direction and the speed of a moving body to be detected. Since the light receiving sections are disposed at random in the above-described circuit structure, the moving-body detecting image sensor having no direction peculiarity is implemented.

The present invention has been described in detail by referring to the specific embodiments. It is obvious that a person skilled in the art can produce a modification of and an alternative to the embodiment within the scope of the gist of the present invention. In other words, the present invention has been disclosed through examples, and should not be interpreted in a limited manner. To determine the gist of the present invention, claims to be described below should be considered.

The entire disclosure of Japanese Patent Application No. 2002-175312 filed on Jun. 17, 2002 including specification, claims, drawings and summary is incorporated herein by reference in its entirety.

What is claimed is:

1. A moving-body detecting image sensor comprising:
   two photodetectors including, respectively, two light receiving sections mutually spaced apart, for outputting electric signals according to a detection of light at the two light receiving sections;
   a delay generation section receiving a first output signal of one of the two photodetectors and for outputting a delayed signal generated by delaying the output signal;
   a first pulse generation section receiving the delayed signal from the delay generation section and for generating a first pulse signal based on the delayed signal;
   a second pulse generation section receiving a second output signal of the other of the two photodetectors and for generating a second pulse signal based on the second output signal; and
   a pulse-arrival detection section receiving the first pulse signal and the second pulse signal from the first pulse generation section, respectively, and the second pulse generation section and for outputting a third signal when the received first and second pulse signals overlap.

2. The moving-body detecting sensor according to claim 1,
   wherein the delay generation section comprises a capacitor for delaying a received signal according to a discharging period of the capacitor; and
   a transistor to which a bias voltage is applied for for adjusting a delay period of the delay generation section.

3. The moving-body detecting image sensor according to claim 1,
   wherein each of the first pulse generation section and the second pulse generation section comprises a capacitor and generates a pulse with a pulse width corresponding to a discharging period of the capacitor; and
   a transistor to which a bias voltage is applied for adjusting a pulse width of the respective pulse signal.

4. The moving-body detecting image sensor according to claim 1, wherein the pulse-arrival detection section comprises an AND circuit for receiving the first pulse signal and the second pulse signal from the first pulse generation section and the second pulse generation section, respectively, and for outputting the third signal when the first and second pulse signals overlap.

5. The moving-body detecting sensor according to claim 1, wherein each of the two photodetectors comprises a photodiode serving as a photodetection element and a transistor to which a bias voltage is applied for adjusting a level of the respective output signal.

6. The moving-body detecting image sensor according to claim 1, wherein the one of the two photodetectors comprises a NOR gate for maintaining the signal output to the delay generation section at a high state.

7. The moving-body detecting image sensor according to claim 1, further comprising a plurality of light receiving sections disposed at random at separate positions, wherein the two photodetectors are provided correspondingly to the plurality of light receiving sections, disposed at random.

* * * * *

UNITED STATES PATENT AND TRADEMARK OFFICE
CERTIFICATE OF CORRECTION

PATENT NO. : 7,242,789 B2  Page 1 of 1
APPLICATION NO. : 10/445654
DATED : July 10, 2007
INVENTOR(S) : Misako Takayasu et al.

It is certified that error appears in the above-identified patent and that said Letters Patent is hereby corrected as shown below:

On the title page, item [57]:
In the Abstract, Line 5, delete "according to".

Signed and Sealed this

Twenty-ninth Day of July, 2008

JON W. DUDAS
*Director of the United States Patent and Trademark Office*